US011205055B2

(12) United States Patent
Obana

(10) Patent No.: US 11,205,055 B2
(45) Date of Patent: Dec. 21, 2021

(54) MANAGEMENT DEVICE AND AIR-CONDITIONING SYSTEM

(71) Applicant: Mitsubishi Electric Corporation, Tokyo (JP)

(72) Inventor: Hiroaki Obana, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 171 days.

(21) Appl. No.: 16/474,815

(22) PCT Filed: Mar. 21, 2017

(86) PCT No.: PCT/JP2017/011262
§ 371 (c)(1),
(2) Date: Dec. 17, 2019

(87) PCT Pub. No.: WO2018/173127
PCT Pub. Date: Sep. 27, 2018

(65) Prior Publication Data
US 2020/0125806 A1 Apr. 23, 2020

(51) Int. Cl.
*G06F 40/47* (2020.01)
*G06F 40/263* (2020.01)
*F24F 11/52* (2018.01)

(52) U.S. Cl.
CPC .............. *G06F 40/47* (2020.01); *F24F 11/52* (2018.01); *G06F 40/263* (2020.01)

(58) Field of Classification Search
CPC ........ G06F 40/47; G06F 40/263; G06F 40/58; F24F 11/52; F24F 11/526
USPC ........................................................... 704/2
See application file for complete search history.

(56) References Cited

U.S. PATENT DOCUMENTS

2010/0185434 A1* 7/2010 Burvall ................. G10L 15/005
704/3

FOREIGN PATENT DOCUMENTS

| JP | H11-219105 A | 8/1999 |
| JP | 2003-274307 A | 9/2003 |
| JP | 2006-046686 A | 2/2006 |

(Continued)

OTHER PUBLICATIONS

International Search Report of the International Searching Authority dated Jun. 20, 2017 for the corresponding International application No. PCT/JP2017/011262 (and English translation).

*Primary Examiner* — Thierry L Pham
(74) *Attorney, Agent, or Firm* — Posz Law Group, PLC

(57) ABSTRACT

A management device is connected to an apparatus and configured to manage the apparatus. The management device includes a multi-language display processing unit configured to, when an input unit receives a change request to change a language of messages to be displayed on a display unit, transmit standard language data to a translation device, and a translated data reception unit configured to acquire translated data translated into a language corresponding to a language environment of a mobile terminal on the translation device with reference to the standard language data. The multi-language display processing unit is configured to change a language of messages to be displayed on the display unit from a default language to a language corresponding to the language environment of the mobile terminal by using the translated data.

12 Claims, 12 Drawing Sheets

(56) References Cited

FOREIGN PATENT DOCUMENTS

JP        2006046686 A  *   2/2006
JP        2012-123441 A     6/2012

* cited by examiner

MANAGEMENT DEVICE AND AIR-CONDITIONING SYSTEM

CROSS REFERENCE TO RELATED APPLICATION

This application is a U.S. national stage application of PCT/JP2017/011262 filed on Mar. 21, 2017, the contents of which are incorporated herein by reference.

TECHNICAL FIELD

The present invention relates to a management device and an air-conditioning system that manage a facility apparatus such as an air-conditioning apparatus.

BACKGROUND ART

A management device such as a remote controller that manages a facility apparatus may be used by an unspecified large number of people, and when the user is unfamiliar with the language displayed on the management device, ease of use drops significantly. For this reason, for management devices provided in locations where people of various nationalities stay, such as hotels, or in organizations such as international corporations, for example, there is demand for a function that changes the language of displayed messages to match the language used by the user.

Given such circumstances, among management devices of the related art, some devices are configured to change the language of messages to be displayed on a display unit (for example, see Patent Literature 1). The management device of Patent Literature 1 stores messages corresponding to each of multiple languages in advance, and is configured to switch the languages of messages to be displayed on a display unit in accordance with a selection operation by the user.

CITATION LIST

Patent Literature

Patent Literature 1: Japanese Unexamined Patent Application Publication No. 2006-46686

SUMMARY OF INVENTION

Technical Problem

However, in a management device of the related art as in Patent Literature 1, in the case of attempting to add messages in a new language, it is necessary for a user to translate messages in a default language by manual operations, and then write the translated messages to the management device. For this reason, there is a problem in that development man-hours are increased and update work is burdensome. Furthermore, as the number of selectable languages increases, the number of times that the screen is switched to select a language also increases. Consequently, there is a problem of reduced ease of use when a language is to be selected.

The present invention has been devised to solve problems as described the above, and an objective of the present invention is to provide a management device and an air-conditioning system that control increases in development man-hours with better ease of use that reduces the workload on the user.

Solution to Problem

A management device according to one embodiment of the present invention is a management device connected to an apparatus and configured to manage the apparatus, and includes a display unit configured to display information related to the apparatus; a memory configured to store standard language data that is information related to management of the apparatus and that includes messages created in a default language; an input unit configured to receive a change request to change a language of messages to be displayed on the display unit; a multi-language display processing unit configured to, when the input unit receives the change request, transmit the standard language data to an external translation device; and a translated data reception unit configured to acquire translated data translated into a language corresponding to a language environment of a mobile terminal on the translation device with reference to the standard language data. The multi-language display processing unit is configured to change the language of messages to be displayed on the display unit from the default language to the language corresponding to the language environment of the mobile terminal by using the translated data.

An air-conditioning system according to another embodiment of the present invention includes the above management device and an air-conditioning apparatus connected to the management device and configured to air-condition an air-conditioned space.

Advantageous Effects of Invention

According to an embodiment of the present invention, translated data that has been translated into a language corresponding to the language environment of a mobile terminal is used to change the language of messages to be displayed on the display unit. For this reason, it is not necessary to store messages corresponding to each of multiple languages in advance, labor can be saved when a new language is to be added, and cumbersome screen-switching operations when a language is to be selected become unnecessary. Consequently, it is possible to provide an easy-to-use management device and an air-conditioning system that controls increases in development man-hours and also reduces the workload on the user.

DESCRIPTION OF EMBODIMENT

Embodiment

Figure 1:
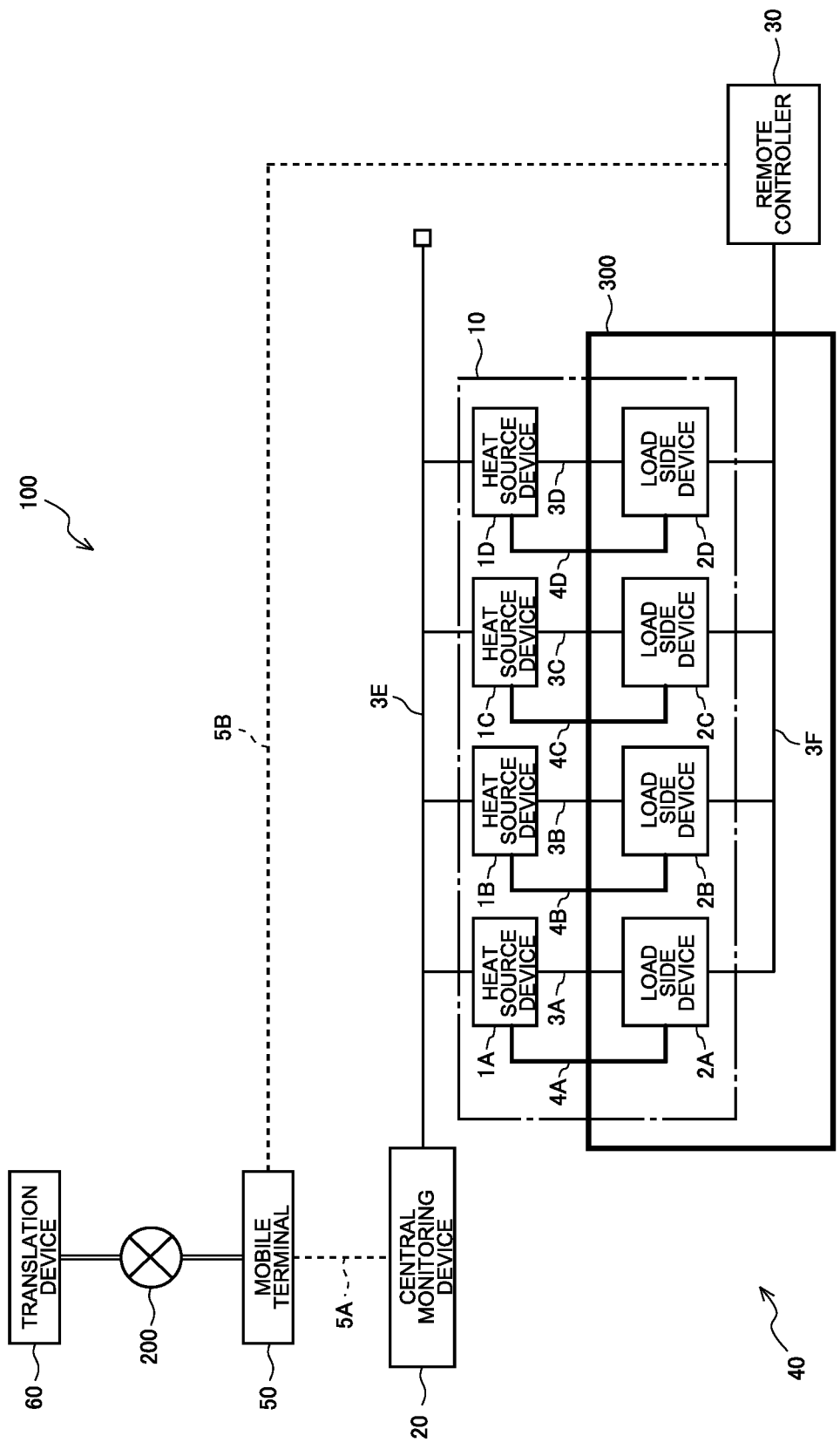
FIG. 1 is a block diagram illustrating an exemplary configuration of a multi-language display system according to Embodiment of the present invention.

FIG. 1 is a block diagram illustrating an exemplary configuration of a multi-language display system according to Embodiment of the present invention. As illustrated in FIG. 1, the multi-language display system 100 includes an apparatus management system 40, a mobile terminal 50, and a translation device 60. The translation device 60 is connected to the mobile terminal 50 over a public network 200.

The apparatus management system 40 includes a facility apparatus 10, a central monitoring device 20, and a remote controller 30. The facility apparatus 10 in Embodiment is an apparatus that is operated and managed through the central monitoring device 20 or the remote controller 30, such as an air-conditioning apparatus, a water heater, a floor heater, a television, a digital television, a DVD recorder, a stereo, a car navigation device, and lighting apparatus. Herein, the facility apparatus 10 corresponds to the "apparatus" of the present invention, while each of the central monitoring device 20 and the remote controller 30 corresponds to the "management device" of the present invention. Also, the apparatus management system 40 corresponds to the "air-conditioning system" of the present invention.

FIG. 1 illustrates an air-conditioning apparatus as an example of the facility apparatus 10. The facility apparatus 10 in FIG. 1 includes heat source devices 1A to 1D and load side devices 2A to 2D. The heat source device 1A and the load side device 2A are connected through an internal communication wire 3A. The heat source device 1B and the load side device 2B are connected through an internal communication wire 3B. The heat source device 1C and the load side device 2C are connected through an internal communication wire 3C. The heat source device 1D and the load side device 2D are connected through an internal communication wire 3D. The central monitoring device 20 and the heat source devices 1A to 1D are connected through an internal communication wire 3E. The remote controller 30 and the load side devices 2A to 2D are connected through an internal communication wire 3F.

Also, the heat source device 1A and the load side device 2A are connected through a refrigerant pipe 4A. The heat source device 1B and the load side device 2B are connected through a refrigerant pipe 4B. The heat source device 1C and the load side device 2C are connected through a refrigerant pipe 4C. The heat source device 1D and the load side device 2D are connected through a refrigerant pipe 4D.

Each of the central monitoring device 20 and the remote controller 30 is connected to the mobile terminal 50 wirelessly. In FIG. 1, the wireless connection relationship between the central monitoring device 20 and the mobile terminal 50 is illustrated as a wireless link 5A, and the wireless connection relationship between the remote controller 30 and the mobile terminal 50 is illustrated as a wireless link 5B. Each of the central monitoring device 20 and the remote controller 30 are capable of wireless communication with the mobile terminal 50 via a connection process.

The heat source devices 1A to 1D supply heating energy or cooling energy to the load side devices 2A to 2D, respectively. In Embodiment, the heat source devices 1A to 1D are connected to the load side devices 2A to 2D by the refrigerant pipes 4A to 4D, respectively, with each forming a refrigerant circuit. In other words, by use of the heating energy or the cooling energy supplied from the heat source devices 1A to 1D, the load side devices 2A to 2D air-condition an air-conditioned space 300, which is rooms or other spaces, and regulate properties such as the temperature, humidity, and cleanliness of the air in the air-conditioned space 300.

Herein, as the heat source devices 1A to 1D are configured similarly to each other and the load side devices 2A to 2D are configured similarly to each other, a specific example will be given for the connection relationship between the heat source device 1A and the load side device 2A. For example, although none is illustrated, the heat source device 1A includes a compressor, a heat source side heat exchanger, and a pressure-reducing device, while the load side device 2A includes a load side heat exchanger. The compressor includes a compressor motor (not illustrated) driven by an inverter for example, and compresses refrigerant. The heat source side heat exchanger is a fin-and-tube heat exchanger for example, and causes heat to be exchanged between refrigerant flowing through the refrigerant circuit and a heat medium flowing in from the load side. The pressure-reducing device is an electronic expansion valve for example, and causes refrigerant to expand and reduce pressure. The load side heat exchanger is a fin-and-tube heat exchanger for example, and causes heat to be exchanged between refrigerant flowing through the refrigerant circuit and air. In other words, the heat source device 1A and the load side device 2A form the refrigerant circuit by the connection of the compressor, the heat source side heat exchanger, the pressure-reducing device, and the load side heat exchanger through the refrigerant pipe 4A. Of course, the pressure-reducing device may also be provided in the load side device 2A.

Figure 2:
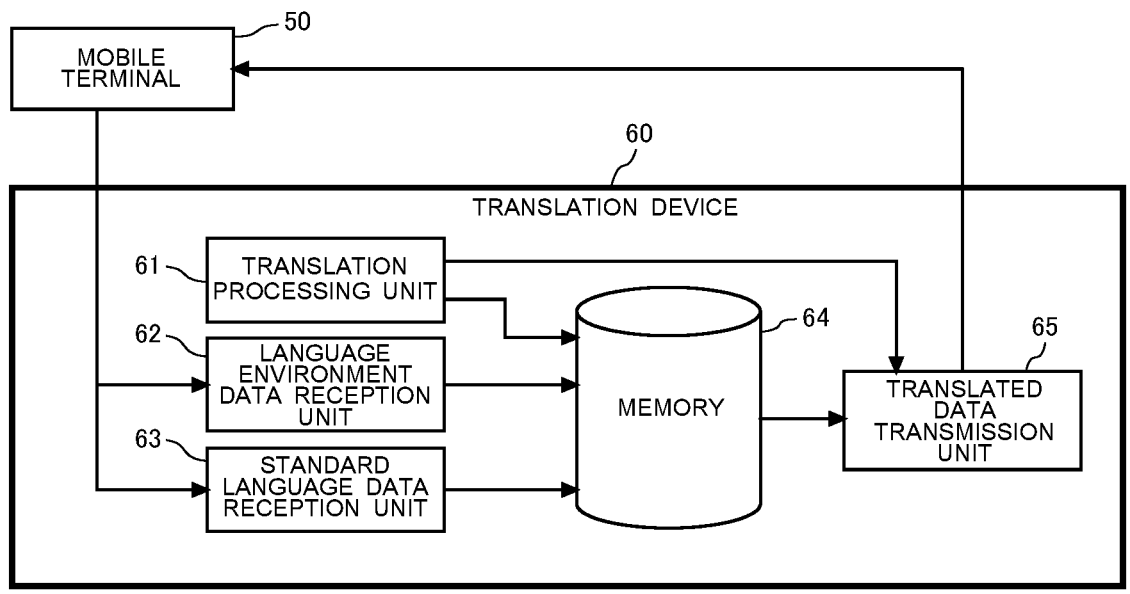
FIG. 2 is a block diagram illustrating a functional configuration of the translation device in FIG. 1.

FIG. 2 is a block diagram illustrating a functional configuration of the translation device in FIG. 1. The translation device 60 is configured as a cloud server based on cloud computing, a physical server such as a web server, or a similar device. The translation device 60 translates standard language data into a language corresponding to the language environment of the mobile terminal 50, and creates translated data. Standard language data refers to information related to the management of the facility apparatus 10, and is information that includes messages created in a default language of the central monitoring device 20 or the remote controller 30. A message refers to information that includes text.

As illustrated in FIG. 2, the translation device 60 is provided with a translation processing unit 61, a language environment data reception unit 62, a standard language data reception unit 63, a memory 64, and a translated data transmission unit 65. The language environment data reception unit 62 receives language environment data from the mobile terminal 50 and stores the language environment data in the memory 64. Language environment data refers to information about a language set in the mobile terminal 50, or in other words information about the language displayed on the screen of the mobile terminal 50, and is held by the mobile terminal 50 in advance.

The standard language data reception unit 63 receives standard language data transmitted from the central monitoring device 20 or the remote controller 30 through the mobile terminal 50, and stores the received standard language data in the memory 64. In the memory 64, a language comparison table associating language environment data with various languages is stored.

The translation processing unit 61 performs a translation process using the language comparison table, with reference to the language environment data stored in the memory 64 by the language environment data reception unit 62 and the standard language data stored in the memory 64 by the standard language data reception unit 63. In other words, the translation processing unit 61 creates translated data by translating the standard language data into the language represented by the language environment data. Also, the translation processing unit 61 stores the created translated data in the memory 64 in association with the language environment data. With this arrangement, translated data created by the translation processing unit 61 is stocked in the memory 64.

More specifically, by collating the language environment data transmitted from the mobile terminal 50 with the language comparison table, the translation processing unit 61 specifies the language set in the mobile terminal 50. Herein, the language set in the mobile terminal 50, or in other words the language corresponding to the language environment of the mobile terminal 50, is designated the "language set in the terminal." Also, the translation processing unit 61 checks whether or not the translation process has been performed in the past on the basis of the most recent language environment data and standard language data stored in the memory 64. In other words, when the language environment data and the standard language data are stored in the memory 64, the translation processing unit 61 determines whether or not the standard language data previously has been translated into the language specified from the language environment data, that is, the language set in the terminal.

In the case in which the translation process has been performed in the past with reference to the most recent language environment data and the standard language data, the translation processing unit 61 does not perform the translation process again, and instead transmits the translated data created in the past with reference to the language environment data and the standard language data to the mobile terminal 50 through the translated data transmission unit 65. In other words, the translation processing unit 61 outputs, to the translated data transmission unit 65, a specified data transmission command instructing the translated data transmission unit 65 to transmit the translated data created in the past with reference to the most recent language environment data and the standard language data.

On the other hand, in the case in which the translation process has not been performed in the past with reference to the most recent language environment data and the standard language data, the translation processing unit 61 translates the standard language data to the language set in the terminal to create translated data, and stores the created translated data in the memory 64. At this time, the translation processing unit 61 outputs, to the translated data transmission unit 65, a translation data transmission command instructing the translated data transmission unit 65 to transmit the translated data stored in the memory 64.

The translated data transmission unit 65 reads out the translated data stored by the translation processing unit 61 from the memory 64, and transmits the read-out translated data to the mobile terminal 50. In other words, the translated data transmission unit 65, following the specified data transmission command or the translation data transmission command from the translation processing unit 61, transmits the data matching the language of the language environment data from among the translated data stored in the memory 64 to the mobile terminal 50.

Figure 3:
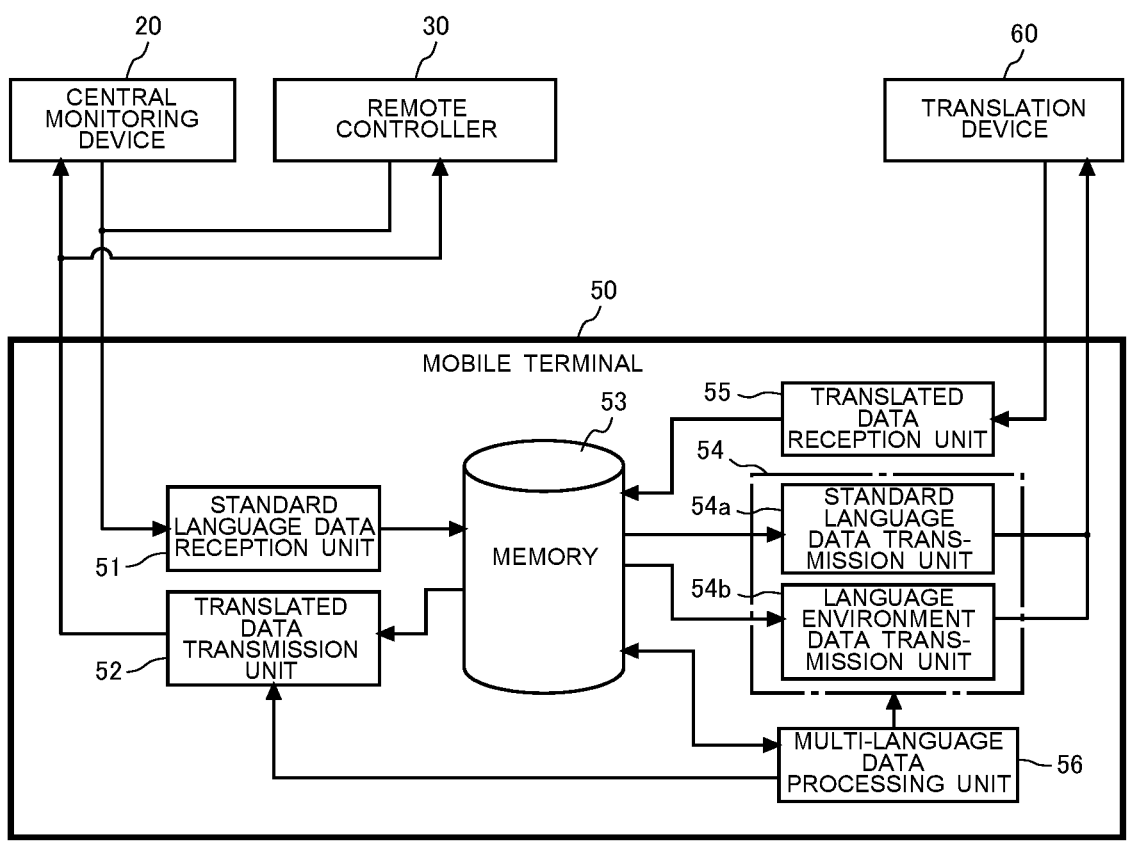
FIG. 3 is a block diagram illustrating a functional configuration of the mobile terminal in FIG. 1.

FIG. 3 is a block diagram illustrating a functional configuration of the mobile terminal in FIG. 1. The mobile terminal 50 is a terminal that can be carried by a user, such as a smartphone, a mobile phone, a tablet personal computer (PC), a laptop PC, and a personal digital assistant (PDA), for example. The mobile terminal 50 has a function of communicating information by use of any communication standard such as Bluetooth (registered trademark; the same applies hereinafter), wireless LAN including Wi-Fi (registered trademark; the same applies hereinafter), and Zigbee (registered trademark; the same applies hereinafter). Also, the mobile terminal 50 has a function of communicating information by short-range wireless communication.

The mobile terminal 50 is able to communicate wirelessly with the central monitoring device 20 and the remote controller 30. Also, the mobile terminal 50 is able to communicate with the translation device 60 through the public network 200. Note that an operating program for achieving functions as described below is pre-installed in the mobile terminal 50.

As illustrated in FIG. 3, the mobile terminal 50 includes a standard language data reception unit 51, a translated data transmission unit 52, a memory 53, a data transmission unit 54, a translated data reception unit 55, and a multi-language data processing unit 56. The data transmission unit 54 includes a standard language data transmission unit 54a and a language environment data transmission unit 54b. Also, although not illustrated, the mobile terminal 50 includes a terminal input unit that receives operations input by the user, and a terminal display unit including a liquid crystal panel for example that displays information such as text and images.

The standard language data reception unit 51 receives standard language data from the central monitoring device 20 or the remote controller 30, and stores the received standard language data in the memory 53. In the memory 53, data such as language environment data is stored.

The multi-language data processing unit 56 monitors the state of the memory 53, and outputs signals instructing the translated data transmission unit 52 and the data transmission unit 54 to transmit data. In other words, the multi-language data processing unit 56 outputs, to the translated data transmission unit 52, a translated data transmission command instructing the translated data transmission unit 52 to transmit translated data. Also, the multi-language data processing unit 56 outputs, to the standard language data transmission unit 54*a*, a language data transmission command instructing the standard language data transmission unit 54*a* to transmit standard language data. Furthermore, the multi-language data processing unit 56 outputs, to the language environment data transmission unit 54*b*, an environment data transmission command instructing the language environment data transmission unit 54*b* to transmit language environment data.

The standard language data transmission unit 54*a*, following the language data transmission command from the multi-language data processing unit 56, transmits the standard language data stored in the memory 53 to the translation device 60. The language environment data transmission unit 54*b*, following the environment data transmission command from the multi-language data processing unit 56, transmits the language environment data stored in the memory 53 to the translation device 60.

The translated data reception unit 55 receives the translated data from the translation device 60 and stores the translated data in the memory 53. The translated data transmission unit 52, following the translated data transmission command from the multi-language data processing unit 56, transmits translated data stored in the memory 53 by the translated data transmission unit 52 to the central monitoring device 20 or the remote controller 30.

Figure 4:
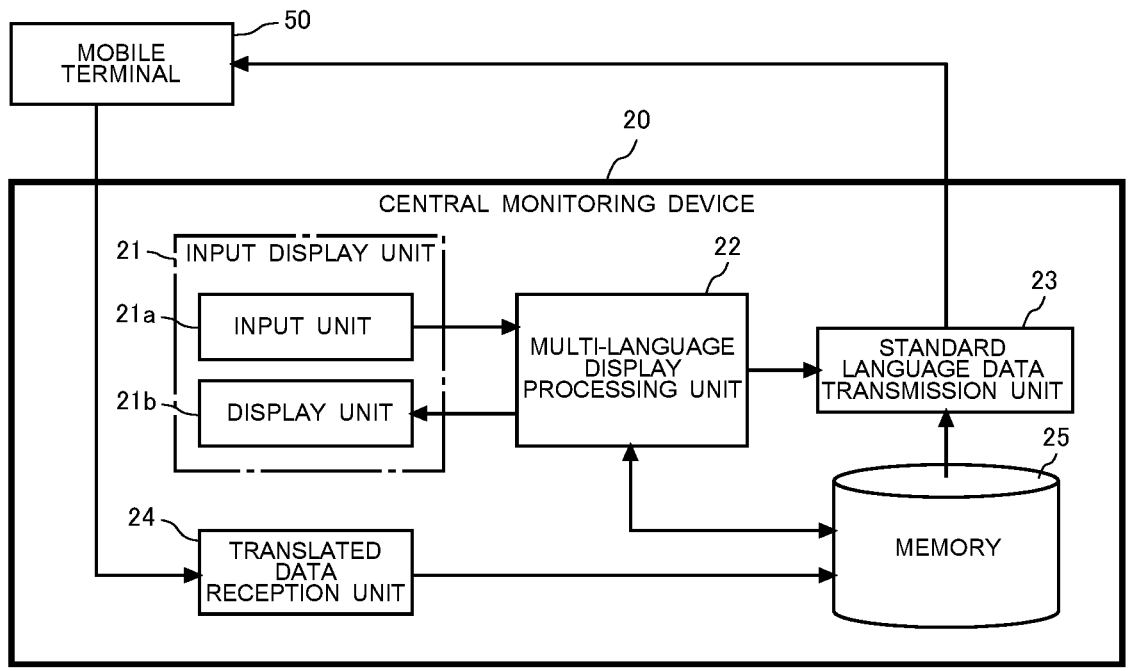
FIG. 4 is a block diagram illustrating a functional configuration of the central monitoring device in FIG. 1.

FIG. 4 is a block diagram illustrating a functional configuration of the central monitoring device in FIG. 1. The central monitoring device 20 monitors the facility apparatus 10 and also controls the operations of the facility apparatus 10 overall. The central monitoring device 20 is configured to communicate with the mobile terminal 50 by short-range wireless communication. Herein, the short-range wireless communication refers to near field communication (NFC) for example, and is a short-range wireless communication standard in which the communication range is approximately 10 cm or less, as typified by ISO/IEC 14443 and ISO/IEC 15693. Of course, the central monitoring device 20 may be configured to communicate with the mobile terminal 50 by use of any communication standard, such as Bluetooth, wireless LAN including Wi-Fi, and Zigbee.

As illustrated in FIG. 4, the central monitoring device 20 is provided with an input display unit 21, a multi-language display processing unit 22, a standard language data transmission unit 23, a translated data reception unit 24, and a memory 25. Besides the standard language data, the memory 25 stores data such as screen information, which is information about various screens to be displayed on a display unit 21*b*.

The input display unit 21 is a touch panel configured by attaching an input unit 21*a* and the display unit 21*b* to each other. The input unit 21*a* receives an operation input by the user, and outputs a signal corresponding to the content of the input operation to the multi-language display processing unit 22. More specifically, the input unit 21*a* detects a position touched by the user, and outputs information about the detected position to the multi-language display processing unit 22. For example, the input unit 21*a* is able to receive an operation requesting to change the language of the display unit 21*b*, or in other words to a change request to change the language of messages to be displayed on the display unit 21*b*.

The display unit 21*b* includes a liquid crystal panel for example, and displays information such as text and images. The display unit 21*b* is able to display information related to the facility apparatus 10. Herein, the information related to the facility apparatus 10 includes not only information related to operating the facility apparatus 10, but also other information, such as information representing the state of the facility apparatus 10.

When the multi-language display processing unit 22 receives an instruction to change the language given by the user through the input unit 21*a*, the multi-language display processing unit 22 outputs, to the standard language data transmission unit 23, the language data transmission command instructing the standard language data transmission unit 23 to transmit the standard language data. Also, the multi-language display processing unit 22 uses the translated data that the translated data reception unit 24 has received from the mobile terminal 50 to change the language of the display unit 21*b*. In other words, the multi-language display processing unit 22 replaces messages in the default language to be displayed on the display unit 21*b* with messages in a language corresponding to the language environment of the mobile terminal 50. Additionally, the multi-language display processing unit 22, following an operation of the input unit 21*a* by the user, uses the screen information in the memory 25 to execute a process of causing an initial screen to be displayed on the display unit 21*b* and to execute a process of switching the screens to be displayed on the display unit 21*b*.

When the input unit 21*a* receives a change request, the standard language data transmission unit 23 transmits standard language data to the translation device 60 through the mobile terminal 50. In other words, the standard language data transmission unit 23, following the language data transmission command from the multi-language display processing unit 22, transmits the standard language data stored in the memory 25 to the mobile terminal 50.

The translated data reception unit 24 acquires translated data translated into a language corresponding to the language environment of the mobile terminal 50 in the translation device 60 with reference to the standard language data. In other words, the translated data reception unit 24 receives the translated data created by the translation device 60 with reference to the language environment data from the mobile terminal 50, and stores the received translated data in the memory 25.

Figure 5:
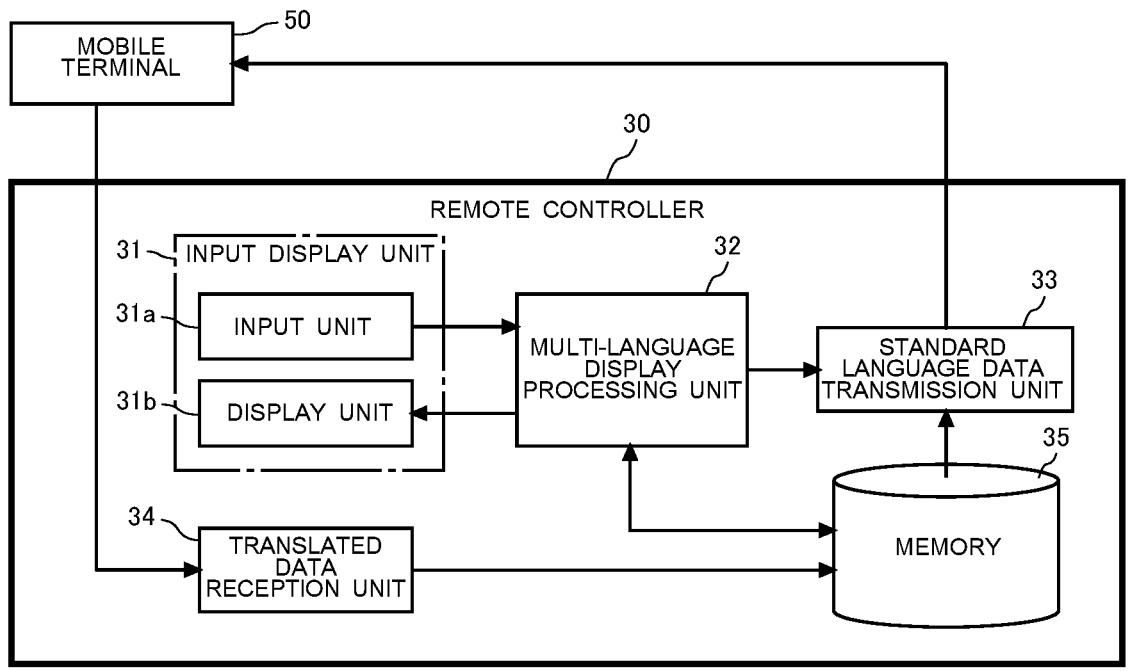
FIG. 5 is a block diagram illustrating a functional configuration of the remote controller in FIG. 1.

FIG. 5 is a block diagram illustrating a functional configuration of the remote controller in FIG. 1. The remote controller 30 is a remote controller provided with a function of remotely operating the facility apparatus 10. The remote controller 30 is configured to communicate with the mobile terminal 50 by short-range wireless communication. Of course, the remote controller 30 may be configured to communicate with the mobile terminal 50 by use of any communication standard, such as Bluetooth, wireless LAN including Wi-Fi, and Zigbee. The remote controller 30 is disposed on a wall of the air-conditioned space 300 or other location.

As illustrated in FIG. 5, the remote controller 30 is provided with an input display unit 31, a multi-language display processing unit 32, a standard language data transmission unit 33, a translated data reception unit 34, and a memory 35. In other words, the functional configuration of the remote controller 30 is similar to the functional configuration of the central monitoring device 20.

Besides the standard language data, the memory 35 stores other information such as screen information, which is information about various screens to be displayed on a display unit 31*b*. The input display unit 31 is a touch panel configured by attaching an input unit 31*a* and the display unit 31*b* to each other, and is configured similarly to the input display unit 21 of the central monitoring device 20.

When the multi-language display processing unit 32 receives an instruction to change the language given by the user through the input unit 31*a*, the multi-language display processing unit 32 transmits the standard language data in the memory 35 to the mobile terminal 50 through the standard language data transmission unit 33. Also, the multi-language display processing unit 32 uses the translated data that the translated data reception unit 34 has received from the mobile terminal 50 to change the language of the display unit 31*b*. Additionally, the multi-language display processing unit 32, following an operation of the input unit 31*a* by the user, uses the screen information in the memory 35 to execute a process of causing an initial screen to be displayed on the display unit 31*b* and to execute a process of switching the screens to be displayed on the display unit 31*b*.

The standard language data transmission unit 33, following the language data transmission command from the multi-language display processing unit 32, transmits the standard language data stored in the memory 35 to the mobile terminal 50. The translated data reception unit 34 receives the translated data from the mobile terminal 50 and stores the translated data in the memory 35.

Herein, each of the above functions in the central monitoring device 20 and the remote controller 30 may be achieved by hardware such as a circuit device, and may also be achieved as software executed on a computational apparatus such as a microcontroller, a digital signal processor (DSP), and a central processing unit (CPU). Also, the memory 25 and the memory 35 may be random access memory (RAM) and read-only memory (ROM), programmable ROM (PROM) such as flash memory, or a hard disk drive (HDD).

Figure 6:
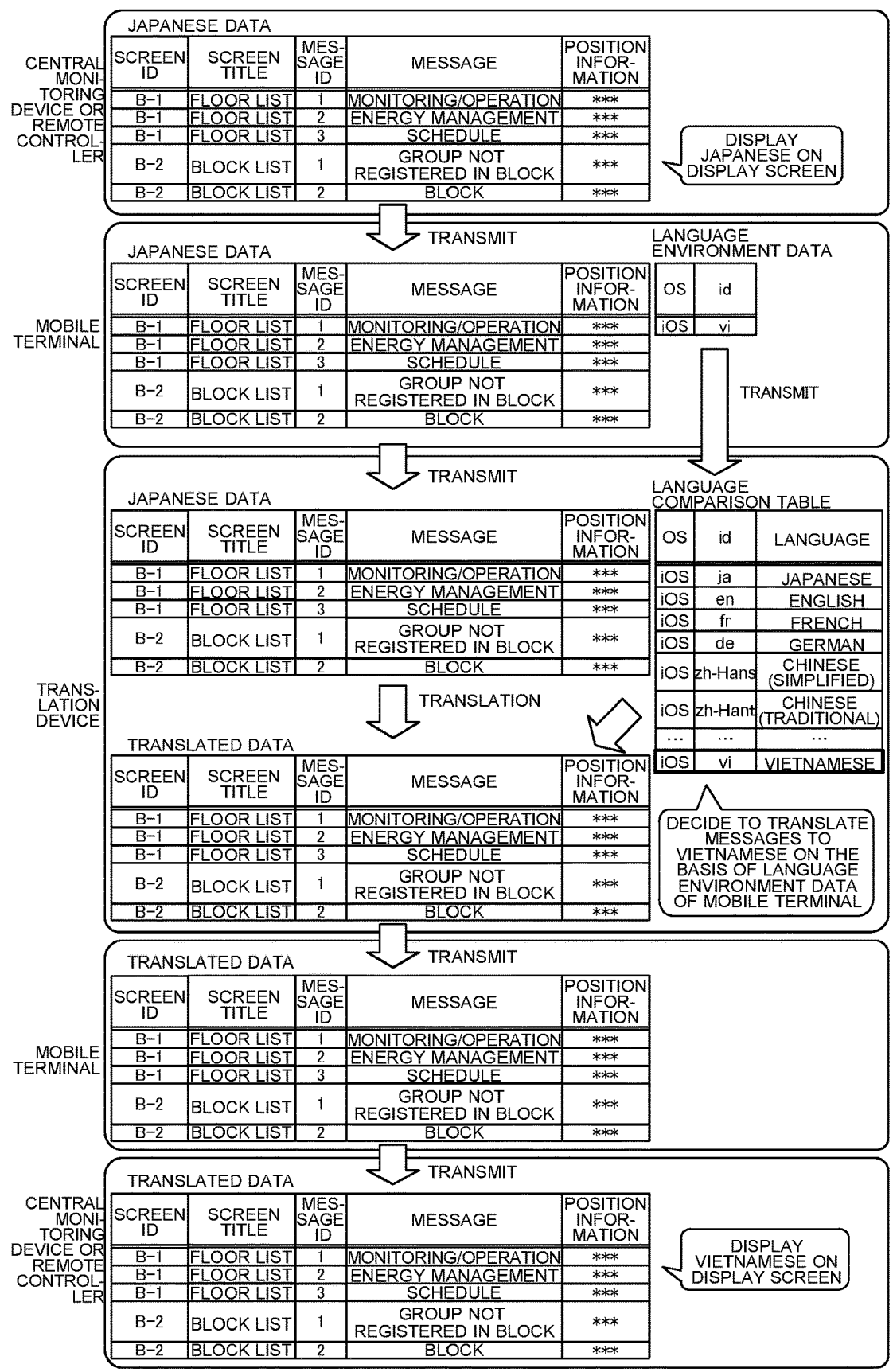
FIG. 6 is an explanatory diagram illustrating the flow of data in the multi-language display system of FIG. 1.

FIG. 6 is an explanatory diagram illustrating the flow of data in the multi-language display system of FIG. 1. FIG. 6 illustrates an example in which the default language of the central monitoring device 20 or the remote controller 30 is set to Japanese. The standard language data when the default language is set to Japanese will be described as "Japanese data" hereinafter.

The central monitoring device 20 stores Japanese data in the memory 25. The Japanese data includes display screens of the display unit 21*b*, information such as messages to be displayed on each display screen, and information about the positions where messages and other elements are to be disposed. For example, as illustrated in FIG. 6, the Japanese data includes information about a "SCREEN ID" representing the ID of each display screen, information about a "SCREEN TITLE" representing the title of the display screen corresponding to each screen ID, information about a "MESSAGE ID" representing the ID of each message, information about a "MESSAGE" representing each message to be displayed on the display unit 21*b*, and "POSITION INFORMATION" representing the position where each message or other element is to be displayed. In this manner, in the Japanese data, as the messages are in Japanese, the central monitoring device 20 displays Japanese messages on each display screen of the display unit 21*b*. When the central monitoring device 20 receives an instruction to change the language given by the user through the input unit 21*a*, the central monitoring device 20 transmits Japanese data stored in the memory 25 to the mobile terminal 50.

Similarly, the remote controller 30 stores Japanese data in the memory 35, and when the remote controller 30 receives an instruction to change the language given by the user through the input unit 31*a*, the remote controller 30 transmits the Japanese data to the mobile terminal 50. Incidentally, in FIG. 6, only the information for two screens is illustrated for simple explanation, but the amount of information in the Japanese data varies depending on factors such as the number of screens to be displayed on the display unit 21*b* and the content of the screens.

The mobile terminal 50 stores language environment data in the memory 53. As one example, FIG. 6 illustrates language environment data including information about an "operating system (OS)" and information about an "id" of the language. The mobile terminal 50 transmits the language environment data stored in the memory 53 together with the Japanese data transmitted from the central monitoring device 20 to the translation device 60.

The translation device 60 stores a language comparison table associating language environment data with various languages. The translation device 60, by collating the information about the "id" of the language included in the language environment data transmitted from the mobile terminal 50 with the language comparison table, is able to specify the language corresponding to the "id", or in other words the language set in the terminal.

In FIG. 6, as the "id" of the language environment data is "iv", the translation device 60 specifies "VIETNAMESE" corresponding to "iv" in the language comparison table. In other words, the translation device 60 decides to translate the Japanese data into Vietnamese on the basis of the language environment data of the mobile terminal 50. Subsequently, the translation device 60 translates the messages in the Japanese data to Vietnamese to create translated data, and transmits the created translated data to the mobile terminal 50. Incidentally, in the language comparison table in FIG. 6, "JAPANESE", "ENGLISH", "FRENCH", "GERMAN", "CHINESE (SIMPLIFIED)", "CHINESE (TRADITIONAL)", and "VIETNAMESE" are illustrated as examples of the various languages associated with the language environment data, but languages other than the above may also be associated with the language environment data.

The mobile terminal 50 transmits the translated data transmitted from the translation device 60 to the central monitoring device 20. The central monitoring device 20 causes messages in Vietnamese to be displayed on each display screen of the display unit 21*b*, in accordance with the translated data transmitted from the mobile terminal 50.

Figure 7:
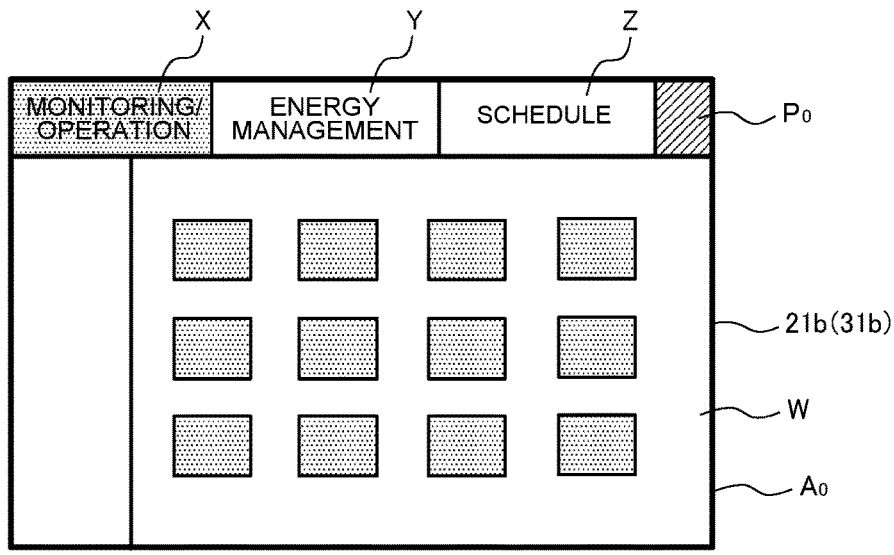
FIG. 7 is an explanatory diagram illustrating a state in which a floor list screen is displayed on the display unit of the central monitoring device in FIG. 4 or the remote controller in FIG. 5.
Figure 8:
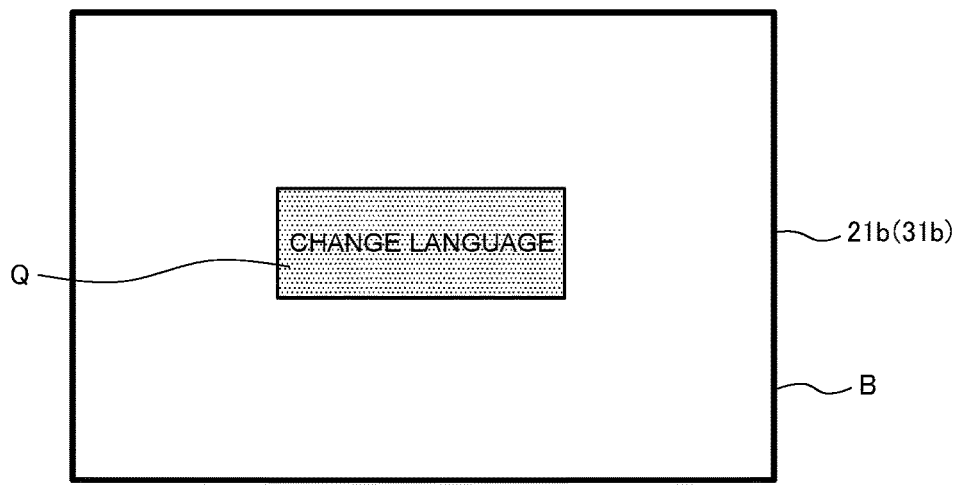
FIG. 8 is an explanatory diagram illustrating a state in which a language change instruction screen is displayed on the display unit of the central monitoring device in FIG. 4 or the remote controller in FIG. 5.
Figure 9:
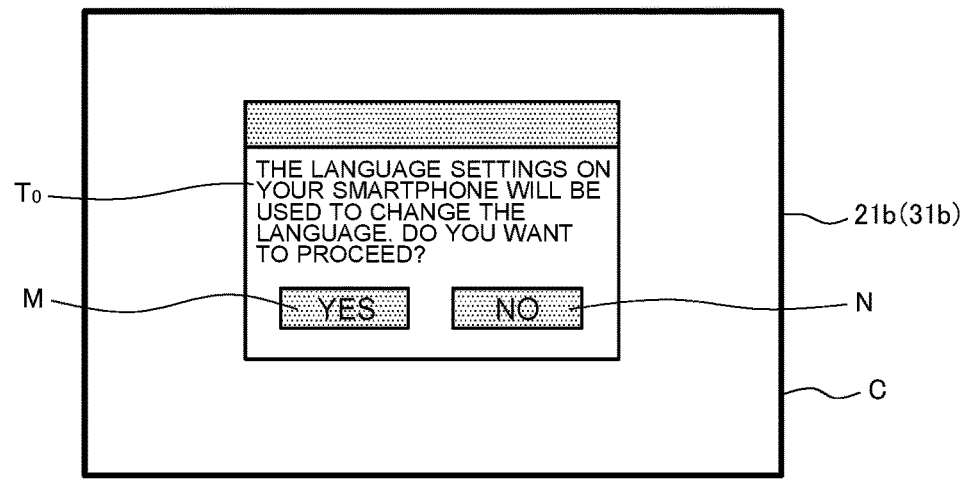
FIG. 9 is an explanatory diagram illustrating a state in which a change confirmation screen is displayed on the display unit of the central monitoring device in FIG. 4 or the remote controller in FIG. 5.
Figure 10:
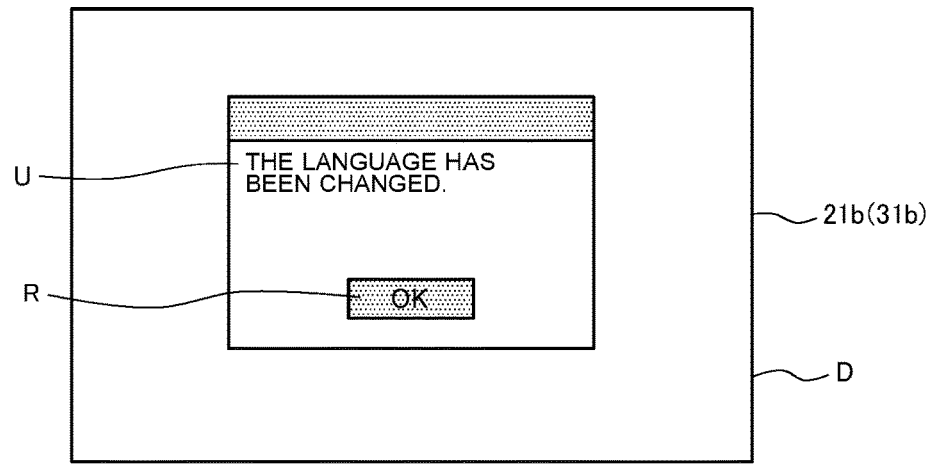
FIG. 10 is an explanatory diagram illustrating a state in which a language confirmation screen is displayed on the display unit of the central monitoring device in FIG. 4 or the remote controller in FIG. 5.
Figure 11:
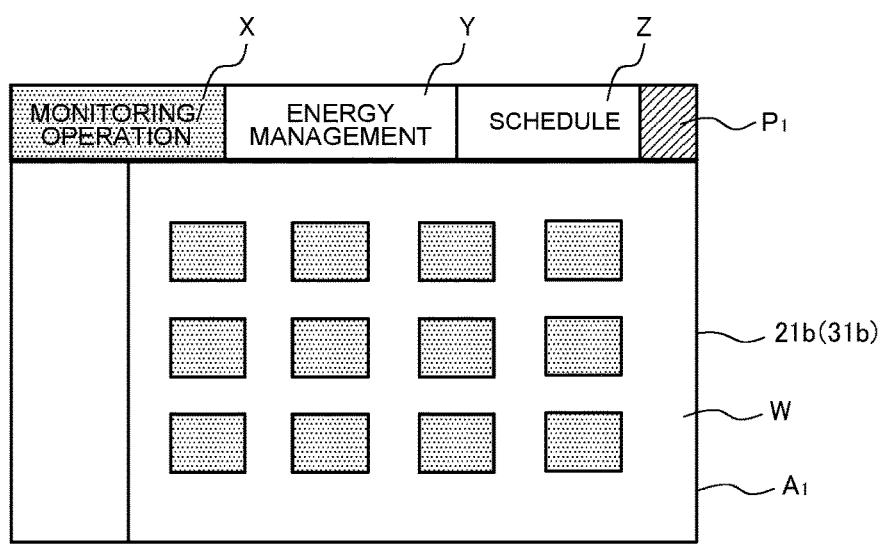
FIG. 11 is an explanatory diagram illustrating a state in which a floor list screen is displayed in a changed language on the display unit of the central monitoring device in FIG. 4 or the remote controller in FIG. 5.
Figure 12:
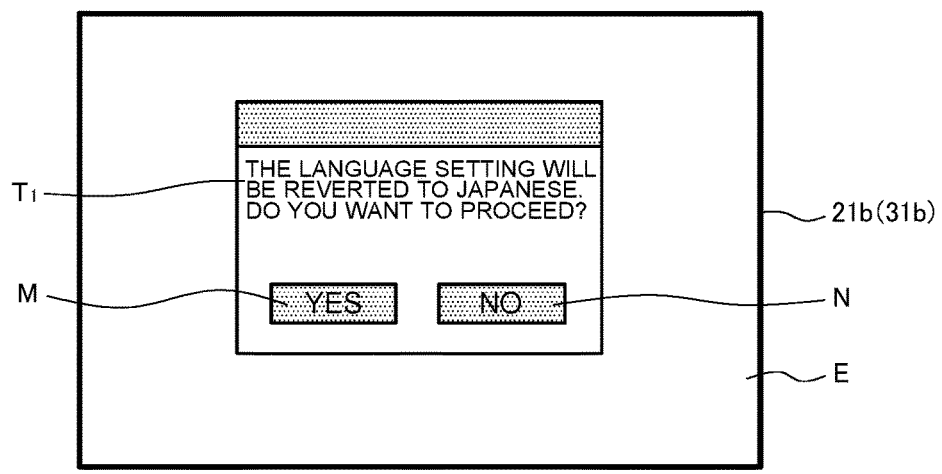
FIG. 12 is an explanatory diagram illustrating a state in which a change confirmation screen prompting for confirmation of a change to a default language is displayed on the display unit of the central monitoring device in FIG. 4 or the remote controller in FIG. 5.
Figure 13:
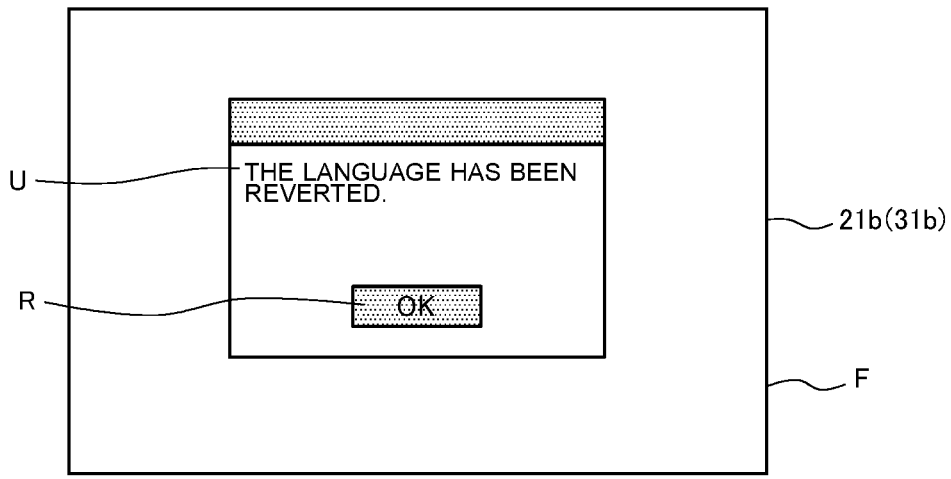
FIG. 13 is an explanatory diagram illustrating a state in which a language confirmation screen representing that language has been changed to the default language is displayed on the display unit of the central monitoring device in FIG. 4 or the remote controller in FIG. 5.

FIG. 7 is an explanatory diagram illustrating a state in which a floor list screen is displayed on the display unit of the central monitoring device in FIG. 4 or the remote controller in FIG. 5. FIG. 8 is an explanatory diagram illustrating a state in which a language change instruction screen is displayed on the display unit of the central monitoring device in FIG. 4 or the remote controller in FIG. 5. FIG. 9 is an explanatory diagram illustrating a state in which a change confirmation screen is displayed on the display unit of the central monitoring device in FIG. 4 or the remote controller in FIG. 5. FIG. 10 is an explanatory diagram illustrating a state in which a language confirmation screen is displayed on the display unit of the central monitoring device in FIG. 4 or the remote controller in FIG. 5. FIG. 11 is an explanatory diagram illustrating a state in which a floor list screen is displayed in a changed language on the display unit of the central monitoring device in FIG. 4 or the remote controller in FIG. 5. FIG. 12 is an explanatory diagram illustrating a state in which a change confirmation screen prompting for confirmation of a change to a default language is displayed on the display unit of the central monitoring device in FIG. 4 or the remote controller in FIG. 5. FIG. 13 is an explanatory diagram illustrating a state in which a language confirmation screen representing that language has been changed to the default language is displayed on the display unit of the central monitoring device in FIG. 4 or the remote controller in FIG. 5. Similarly to FIG. 6, FIGS. 7 to 13 illustrate an example of a case in which the default language of the central monitoring device 20 or the remote controller 30 is "JAPANESE", and the changed language, that is, the language set in the terminal, is "VIETNAMESE."

As described above, as the central monitoring device 20 and the remote controller 30 are configured similarly to each other, with reference to FIGS. 7 to 13, the transition of display screens on the display unit 21b in the central monitoring device 20 will be described below. Also, in this case described below, the mobile terminal 50 is described as a smartphone.

In the example of FIG. 7, on a floor list screen $A_0$, a switching button X labeled "MONITORING/OPERATION", a switching button Y labeled "ENERGY MANAGEMENT", a switching button Z labeled "SCHEDULE", and a transition button $P_0$ are displayed as multiple virtual buttons. Each of the messages of the switching buttons X to Z is expressed in Japanese. On the floor list screen $A_0$ of FIG. 7, the switching button X is in a different display state from those of the other switching buttons, and in a display field W, information related to monitoring and operation is displayed. For example, on the floor list screen $A_0$ of FIG. 7, when the user touches the switching button Y, information related to energy management is displayed in the display field W. Also, on the floor list screen $A_0$ of FIG. 7, when the user touches the switching button Z, information related to a schedule display is displayed in the display field W. In this manner, on the floor list screen $A_0$, the information in the display field W is switched in accordance with touch operations on the switching buttons X to Z by the user.

Also, when the user touches the transition button $P_0$, the screen transitions to a language change instruction screen B as in FIG. 8. In other words, when the user touches the transition button $P_0$, the input unit 21a outputs information about the position of the transition button $P_0$ to the multi-language display processing unit 22, and the multi-language display processing unit 22 causes the floor list screen $A_0$ on the display unit 21b to transition to the language change instruction screen B in accordance with the screen information in the memory 25. Herein, the operation of the user touching each button corresponds to an operation of the user designating each button.

In the example of FIG. 8, on the language change instruction screen B, a language change button Q for receiving the instruction to change the language is displayed. When the user touches the language change button Q, the screen transitions to a change confirmation screen C as in FIG. 9. In other words, when the user touches the language change button Q, the input unit 21a outputs information about the position of the language change button Q to the multi-language display processing unit 22, and the multi-language display processing unit 22 causes the language change instruction screen B on the display unit 21b to transition to the change confirmation screen C in accordance with the screen information in the memory 25.

In the example of FIG. 9, on the change confirmation screen C, an affirmative button M labeled "YES", a negative button N labeled "NO", and confirmation text $T_0$ prompting the user to confirm whether or not to match the language setting of the display unit 21b to the language setting of the mobile terminal 50 are displayed. In FIG. 9, the sentences "THE LANGUAGE SETTINGS ON YOUR SMARTPHONE WILL BE USED TO CHANGE THE LANGUAGE. DO YOU WANT TO PROCEED?" are illustrated as an example of the confirmation text $T_0$. Of course, the confirmation text $T_0$ may also be a single sentence such as "DO YOU WANT TO CHANGE THE LANGUAGE USING THE LANGUAGE SETTING ON YOUR SMARTPHONE", for example.

When the user brings the mobile terminal 50 close to the central monitoring device 20 and touches the affirmative button M, the screen transitions to a language confirmation screen D as in FIG. 10. In other words, when the user touches the affirmative button M, the input unit 21a outputs information about the position of the affirmative button M to the multi-language display processing unit 22, and the multi-language display processing unit 22 transmits the Japanese data in the memory 25 to the mobile terminal 50. Subsequently, the mobile terminal 50 transmits Japanese data transmitted from the multi-language display processing unit 22 and the language environment data in the memory 53 to the translation device 60. The translation device 60 specifies the language set in the terminal by collating the language environment data transmitted from the mobile terminal 50 with the language comparison table, and translates the Japanese data to the language set in the terminal to create translated data. Next, the translation device 60 transmits the created translated data to the mobile terminal 50, and the mobile terminal 50 transmits the translated data received from the translation device 60 to the central monitoring device 20. Subsequently, in accordance with the screen information in the memory 25, the multi-language display processing unit 22 uses the translated data to cause the change confirmation screen C on the display unit 21b to transition to the language confirmation screen D.

Herein, as described above, the case of the screen transitioning in the order of the floor list screen $A_0$, the language change instruction screen B, the change confirmation screen C, and the language confirmation screen D, the affirmative button M corresponds to a "change request button" of the present invention. Consequently, the input unit 21a receives the operation designating the affirmative button M as a change request. On the other hand, when the user touches the negative button N, the screen transitions to the floor list screen $A_0$ as in FIG. 7.

In the example of FIG. 10, on the language confirmation screen D, notification text U informing the user that the language has been changed and a confirmation button R labeled "OK" are displayed. The confirmation button R enables the user to allow the language setting to be changed for each screen. In the example of FIG. 10, content in Vietnamese representing that "The language has been changed" is expressed as the notification text U. In other words, in the example of FIG. 10, the notification text U is text informing the user that the language has been changed and is created in a language corresponding to the language environment of the mobile terminal 50, and the confirmation button R is a button prompting the user to confirm whether or not the changed language is suitable. When the user touches the confirmation button R, the screen transitions to a floor list screen $A_1$ as in FIG. 11. On the floor list screen $A_1$, switching buttons X to Z labeled in Vietnamese and a transition button $P_1$ are displayed.

When the user touches the transition button $P_1$, the screen transitions to the language change instruction screen B as in FIG. 8. Additionally, when the user touches the language change button Q, the screen transitions to a change confirmation screen E as in FIG. 12. In the example of FIG. 12, on the change confirmation screen E, the affirmative button M, the negative button N, and confirmation text $T_1$ prompting the user to confirm whether or not to revert the language setting of the display unit 21b to the default language are displayed. In FIG. 12, the sentences "THE LANGUAGE SETTING WILL BE REVERTED TO JAPANESE. DO YOU WANT TO PROCEED?" are illustrated as an example of the confirmation text $T_1$.

When the user touches the affirmative button M, the screen transitions to a language confirmation screen F as in FIG. 13. In other words, when the user touches the affirmative button M, the input unit 21a outputs information about the position of the affirmative button M to the multi-language display processing unit 22. When information about the position of the affirmative button M is output from the input unit 21a, in accordance with the screen information in the memory 25, the multi-language display processing unit 22 uses the Japanese data to cause the change confirmation screen E on the display unit 21b to transition to the language confirmation screen F. On the language confirmation screen F, when the user touches the confirmation button R, the screen transitions to the floor list screen $A_0$ as in FIG. 7. On the other hand, on the change confirmation screen E as in FIG. 12, when the user touches the negative button N, the screen transitions to the floor list screen $A_1$ as in FIG. 11.

In the case of changing the language, the above description gives an example of a case of the screen transitioning in the order of the floor list screen $A_0$, the language change instruction screen B, the change confirmation screen C, the language confirmation screen D, and the floor list screen $A_1$, but the transition is not limited to this example. In other words, at least one of the transition to the language change instruction screen B, the transition to the language confirmation screen D, and the transition to the change confirmation screen C may be omitted. For example, the multi-language display processing unit 22 may cause the screen to transition from the floor list screen $A_0$ to the change confirmation screen C, or cause the screen to transition from the change confirmation screen C to the floor list screen $A_1$. Also, the multi-language display processing unit 22 may cause the screen to transition from the floor list screen $A_0$ to the language confirmation screen D or to the floor list screen $A_1$. In this case, the transition button $P_0$ corresponds to the "change request button" of the present invention, and the input unit 21a receives an operation designating the transition button $P_0$ as a change request. Furthermore, the multi-language display processing unit 22 may also cause the screen to transition in the order of the floor list screen $A_0$, the language change instruction screen B, and the language confirmation screen D or the floor list screen $A_1$. In this case, the language change button Q corresponds to the "change request button" of the present invention, and the input unit 21a receives an operation designating the language change button Q as a change request.

Similarly, in the case of reverting the language, the above description gives an example of a case of the screen transitioning in the order of the floor list screen $A_1$, the language change instruction screen B, the change confirmation screen E, the language confirmation screen F, and the floor list screen $A_0$, but the transition is not limited to this example. In other words, at least one of the transition to the language change instruction screen B, the transition to the change confirmation screen E, and the transition to the language confirmation screen F may be omitted.

Also, FIG. 8 illustrates an example in which the message of the language change button Q is expressed in the default language, but the configuration is not limited to this example, and the message may also be expressed in English language, which is widely known, for example. Similarly, FIGS. 9 and 12 illustrate examples in which the messages of the confirmation text $T_0$, the confirmation text $T_1$, the affirmative button M, and the negative button N are expressed in the default language, but the configuration is not limited to these examples, and each message may also be expressed in English language, which is widely known, for example.

Figure 14A:
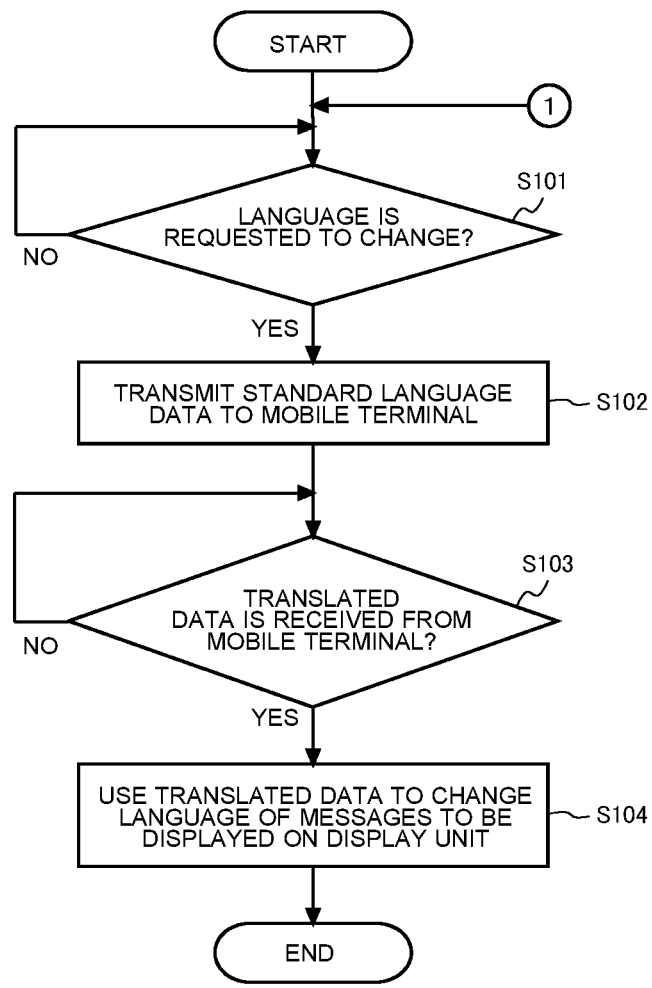
FIG. 14A is a flowchart illustrating a process of changing a language setting among operations by the central monitoring device in FIG. 4 or the remote controller in FIG. 5.
Figure 14B:
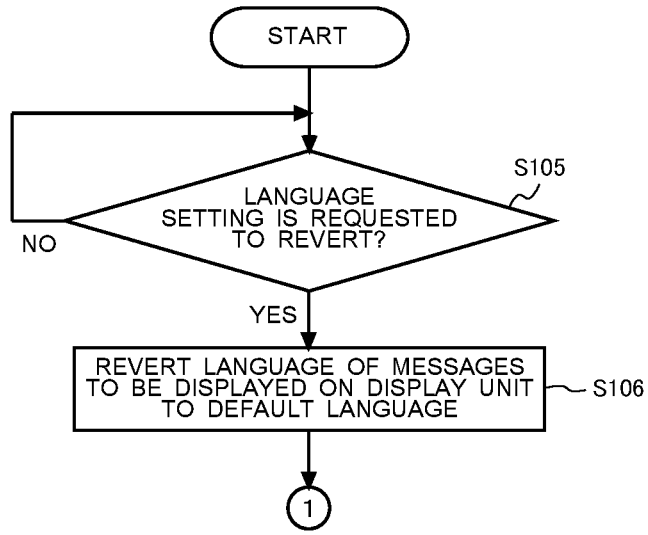
FIG. 14B is a flowchart illustrating a process of reverting the language setting among operations by the central monitoring device in FIG. 4 or the remote controller in FIG. 5.

FIG. 14A is a flowchart illustrating a process of changing a language setting among operations by the central monitoring device in FIG. 4 or the remote controller in FIG. 5. FIG. 14B is a flowchart illustrating a process of reverting the language setting among operations by the central monitoring device in FIG. 4 or the remote controller in FIG. 5. As the operation content of the central monitoring device 20 centered on the multi-language display processing unit 22 and the operation content of the remote controller 30 centered on the multi-language display processing unit 32 are similar to each other, herein, the operation content of the central monitoring device 20 is described.

First, with reference to FIG. 14A, a process of changing the language setting of the display unit 21b will be described. The multi-language display processing unit 22 continually checks whether or not a change request to change the language of the display unit 21b exists (step S101). In other words, in the example of FIG. 7, the multi-language display processing unit 22 stands by until the user performs a touch operation on the transition button $P_0$ of the input display unit 21 (NO in step S101).

When the user touches the transition button $P_0$ of the input display unit 21 and performs an operation of requesting a language change, the multi-language display processing unit 22 determines that a change request to change the language exists (YES in step S101). Next, the multi-language display processing unit 22 transmits the standard language data in the memory 25 to the mobile terminal 50 through the standard language data transmission unit 23 (step S102), and stands by until translated data is sent back from the mobile terminal 50 (NO in step S103).

When translated data is received from the mobile terminal 50 (YES in step S103), the multi-language display processing unit 22 uses the translated data to change the language of messages to be displayed on the display unit 21b from the default language to a language corresponding to the language environment of the mobile terminal 50 (step S104).

By the process from steps S101 to S104 above, the floor list screen $A_0$ illustrated in FIG. 7 transitions to the floor list screen $A_1$ illustrated in FIG. 11, for example. The multi-language display processing unit 32 of the remote controller 30 executes the process of the series from step S101 to step S104 similarly to the multi-language display processing unit 22 described above.

Next, with reference to FIG. 14B, a process of reverting the language setting of the display unit 21b back to the default state will be described. The multi-language display processing unit 22 continually checks whether or not a request to revert the language setting of the display unit 21b back to the default language setting exists (step S105). In other words, in the example of FIG. 11, the multi-language display processing unit 22 continues the process of displaying messages on the display unit 21b in the changed language until the user performs a touch operation on the transition button $P_1$ of the input display unit 21 (NO in step S105).

On the other hand, when the user touches the transition button $P_1$ of the input display unit 21 and performs an operation of requesting a reversion of the language setting, the multi-language display processing unit 22 determines that a request to revert the language setting exists (YES in step S105). Subsequently, the multi-language display processing unit 22 reverts the language of messages to be displayed on the display unit 21b back to the default language. In other words, the multi-language display processing unit 22 uses the standard language data in the memory 25 to replace the messages to be displayed on the display unit 21b with messages in the default language (step S106), and the process returns to step S101.

Herein, when the language of messages to be displayed on the display unit 21b is to be reverted back to the default language, the multi-language display processing unit 22 may also delete the translated data in the memory 25. By the process in step S105 and step S106 above, the floor list screen $A_1$ illustrated in FIG. 11 transitions to the floor list screen $A_0$ illustrated in FIG. 7, for example. The multi-language display processing unit 32 of the remote controller 30 executes the process of the series from step S105 to step S106 similarly to the multi-language display processing unit 22 described above.

Figure 15:
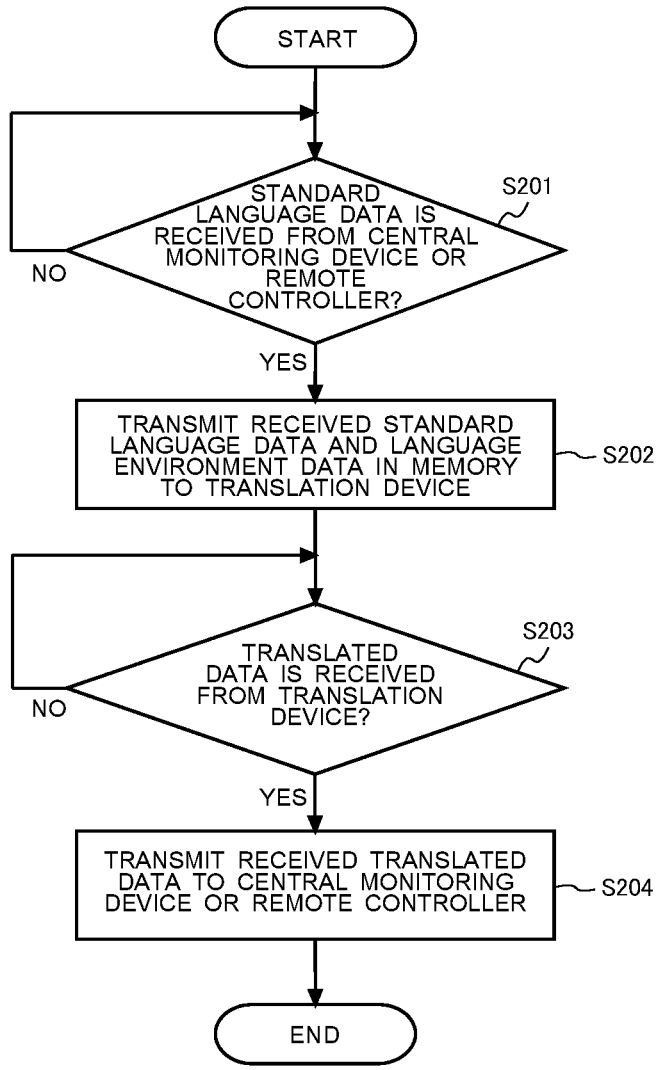
FIG. 15 is a flowchart illustrating operations of the mobile terminal in FIG. 3.

FIG. 15 is a flowchart illustrating operations of the mobile terminal in FIG. 3. With reference to FIG. 15, the operation content of the mobile terminal 50 centered on the multi-language data processing unit 56 will be described.

The multi-language data processing unit 56 checks whether or not standard language data has been received from the central monitoring device 20 or the remote controller 30 (step S201). In other words, the multi-language data processing unit 56 stands by until standard language data is received through the standard language data reception unit 51 (NO in step S201).

When standard language data is received (YES in step S201), the multi-language data processing unit 56 transmits the received standard language data and the language environment data stored in the memory 53 to the translation device 60 (step S202). Subsequently, the multi-language data processing unit 56 stands by until translated data is sent back from the translation device 60 (NO in step S203). When translated data is received from the translation device 60 (YES in step S203), the multi-language data processing unit 56 transmits the received translated data to the central monitoring device 20 or the remote controller 30 (step S204).

Figure 16:
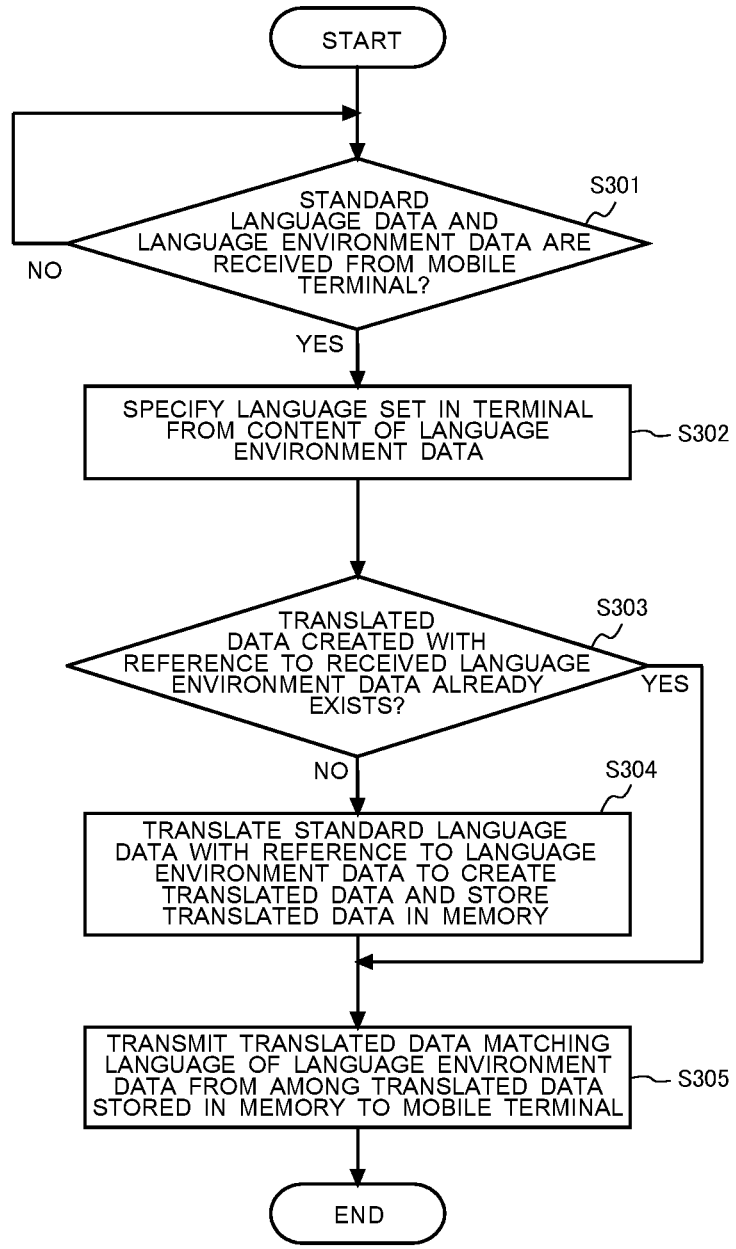
FIG. 16 is a flowchart illustrating operations of the translation device in FIG. 2.

FIG. 16 is a flowchart illustrating operations of the translation device in FIG. 2. With reference to FIG. 16, the operation content of the translation device 60 centered on the translation processing unit 61 will be described.

The translation processing unit 61 checks whether or not standard language data and language environment data have been received from the mobile terminal 50 (step S301). In other words, the translation processing unit 61 stands by until standard language data and language environment data are received through the language environment data reception unit 62 and the standard language data reception unit 63 (NO in step S301).

When standard language data and language environment data are received (YES in step S301), the translation processing unit 61 specifies the translation target language, that is, the language set in the terminal, from the content of the language environment data (step S302). Next, the translation processing unit 61 determines whether or not translated data created with reference to the received language environment data already exists in the memory 64. In other words, the translation processing unit 61 checks whether or not translated data corresponding to the language specified from the language environment data exists in the memory 64 (step S303).

In the case in which translated data corresponding to the language specified from the language environment data does not exist in the memory 64 (NO in step S303), the translation processing unit 61 translates the standard language data into the language specified from the language environment data, and stores the translation in the memory 64 as translated data (step S304). Subsequently, the translation processing unit 61 transmits the stored translated data to the mobile terminal 50 through the translated data transmission unit 65. In other words, the translation processing unit 61 transmits translated data matching the language specified from the language environment data from among the translated data stored in the memory 64 to the mobile terminal 50 (step S305).

On the other hand, in the case in which translated data corresponding to the language specified from the language environment data exists (YES in step S303), the translation processing unit 61 transmits the translated data to the mobile terminal 50. In other words, the translation processing unit 61 transmits translated data matching the language specified from the language environment data from among the translated data stored in the memory 64 to the mobile terminal 50 (step S305).

As described above, the central monitoring device 20 and the remote controller 30, or in other words a management device uses translated data translated into a language corresponding to the language environment of the mobile terminal 50 to change the language of messages to be displayed on the display unit 21b. For this reason, it is not necessary to store messages corresponding to each of multiple languages in advance, labor can be saved when a new language is to be added, and cumbersome screen-switching operations when a language is to be selected become unnecessary. Consequently, increases in development man-hours can be controlled while the workload on the user can also be reduced, and an improvement in ease of use can be attained.

In other words, the management device achieves a multi-language display function in coordination with the mobile terminal 50 and the translation device 60. Herein, as the language displayed on the mobile terminal 50 usually is set to a language that the user is familiar with, the multi-language display system 100 is able to automatically specify the language set in the mobile terminal 50 from the language environment data, and perform automatic translation. Consequently, by simply bringing the mobile terminal 50 into communicable range of the management device, without preparing messages corresponding to a large number of languages in advance, it is possible to automatically translate messages to be displayed on the display unit into a language demanded by the user, and cause the translated messages to be displayed on the display unit. In this manner, as it is possible to automatically match the language setting of the display unit to the language setting of the mobile terminal 50 that the user is familiar with, the management device is able to perform the process of switching a variety of language settings easily and rapidly.

Incidentally, in a management device of the related art as in Patent Literature 1, as it is necessary to store messages corresponding to each of multiple languages in advance, there is a problem of increasing the memory capacity. Regarding this point, as it is not necessary for the central monitoring device 20 and the remote controller 30 to store translated data corresponding to each of multiple languages, increases in the memory capacity can be controlled.

<Modification>

Figure 17:
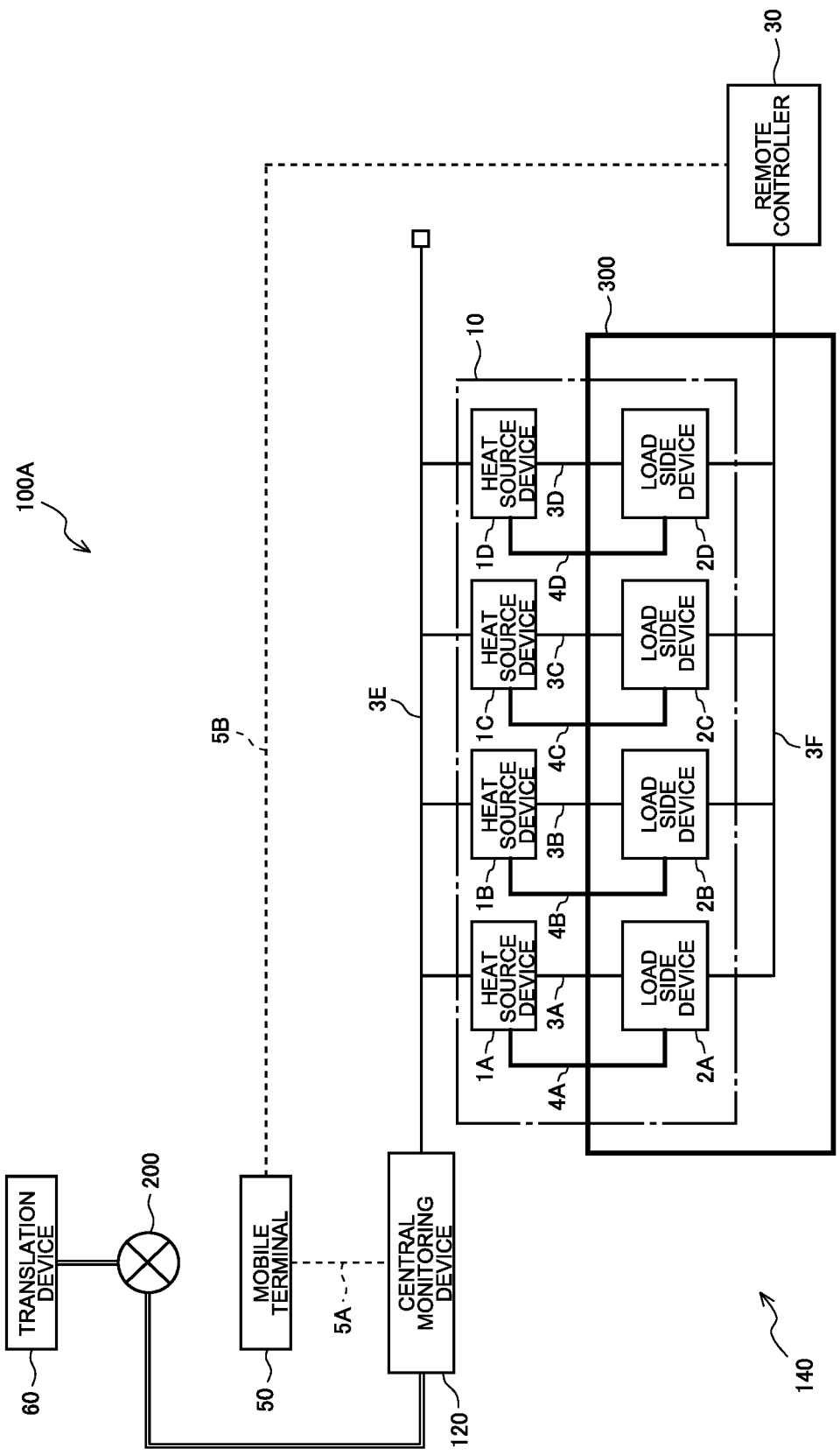
FIG. 17 is a block diagram illustrating an exemplary configuration of a multi-language display system according to a modification of Embodiment of the present invention.

FIG. 17 is a block diagram illustrating an exemplary configuration of a multi-language display system according to a modification of Embodiment of the present invention. In the multi-language display system 100A of the present modification, a central monitoring device 120 is connected to the translation device 60 through the public network 200. Components of the configuration that are substantially the same as the multi-language display system 100 described above will be denoted using the same reference signs, and a description of such components will be omitted. As illustrated in FIG. 17, the multi-language display system 100A has an apparatus management system 140 including the facility apparatus 10, the central monitoring device 120, and the remote controller 30.

Figure 18:
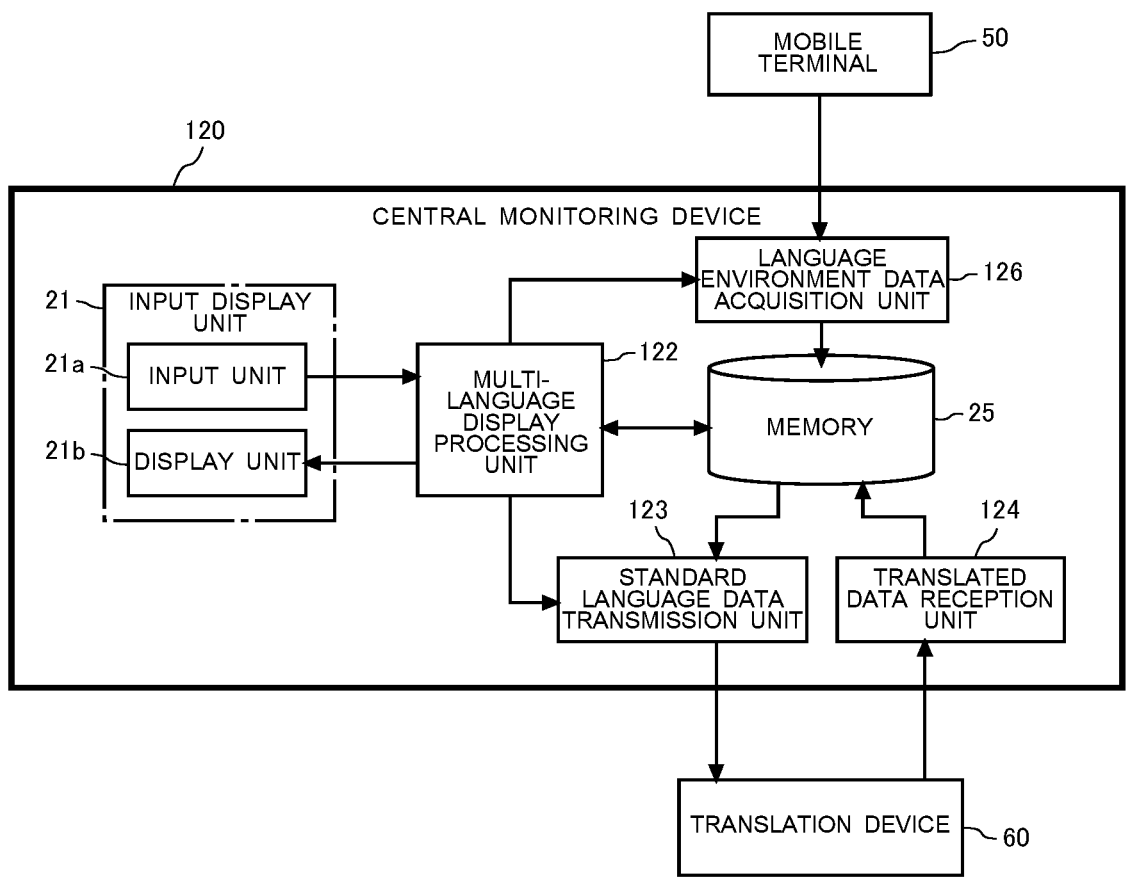
FIG. 18 is a block diagram illustrating a functional configuration of the central monitoring device in FIG. 17.

FIG. 18 is a block diagram illustrating a functional configuration of the central monitoring device in FIG. 17. As illustrated in FIG. 17, the central monitoring device 120 includes the input display unit 21, a multi-language display processing unit 122, a standard language data transmission unit 123, a translated data reception unit 124, the memory 25, and a language environment data acquisition unit 126.

The translated data reception unit 124 receives the translated data from the translation device 60 and stores the translated data in the memory 25. In other words, the translation device 60 of the present modification is configured to transmit translated data to the central monitoring device 120. The rest of the configuration of the translated data reception unit 124 is similar to that of the translated data reception unit 24.

When the multi-language display processing unit 122 receives an instruction to change the language given by the user through the input unit 21*a*, the multi-language display processing unit 122 outputs, to the language environment data acquisition unit 126, an environment data acquisition command instructing the language environment data acquisition unit 126 to acquire language environment data. Also, the multi-language display processing unit 122 uses the translated data that the translated data reception unit 124 has received from the translation device 60 to change the language of the display unit 21*b*.

Furthermore, the multi-language display processing unit 122 determines whether or not translated data corresponding to the language environment data acquired by the language environment data acquisition unit 126 is stored in the memory 25. In other words, the multi-language display processing unit 122 checks whether or not translated data created with reference to the language environment data acquired by the language environment data acquisition unit 126 already exists in the memory 25.

When translated data corresponding to language environment data acquired by the language environment data acquisition unit 126 is stored in the memory 25, the multi-language display processing unit 122 uses the translated data to change the language of messages to be displayed on the display unit 21*b* from the default language to a language corresponding to the language environment of the mobile terminal 50. On the other hand, when translated data corresponding to the language environment data acquired by the language environment data acquisition unit 126 is not stored in the memory 25, the multi-language display processing unit 122 outputs, to the standard language data transmission unit 123, a data transmission command instructing the standard language data transmission unit 123 to transmit the language environment data and the standard language data. The rest of the configuration of the multi-language display processing unit 122 is similar to that of the multi-language display processing unit 22.

The language environment data acquisition unit 126, following the environment data acquisition command from the multi-language display processing unit 122, acquires language environment data from the mobile terminal 50 and stores the acquired language environment data in the memory 25. In other words, the mobile terminal 50 of the present modification is configured to transmit the language environment data to the central monitoring device 120.

The standard language data transmission unit 123, following the data transmission command from the multi-language display processing unit 122, transmits standard language data and language environment data in the memory 25 to the translation device 60. The rest of the configuration of the standard language data transmission unit 123 is similar to that of the standard language data transmission unit 23.

Figure 19:
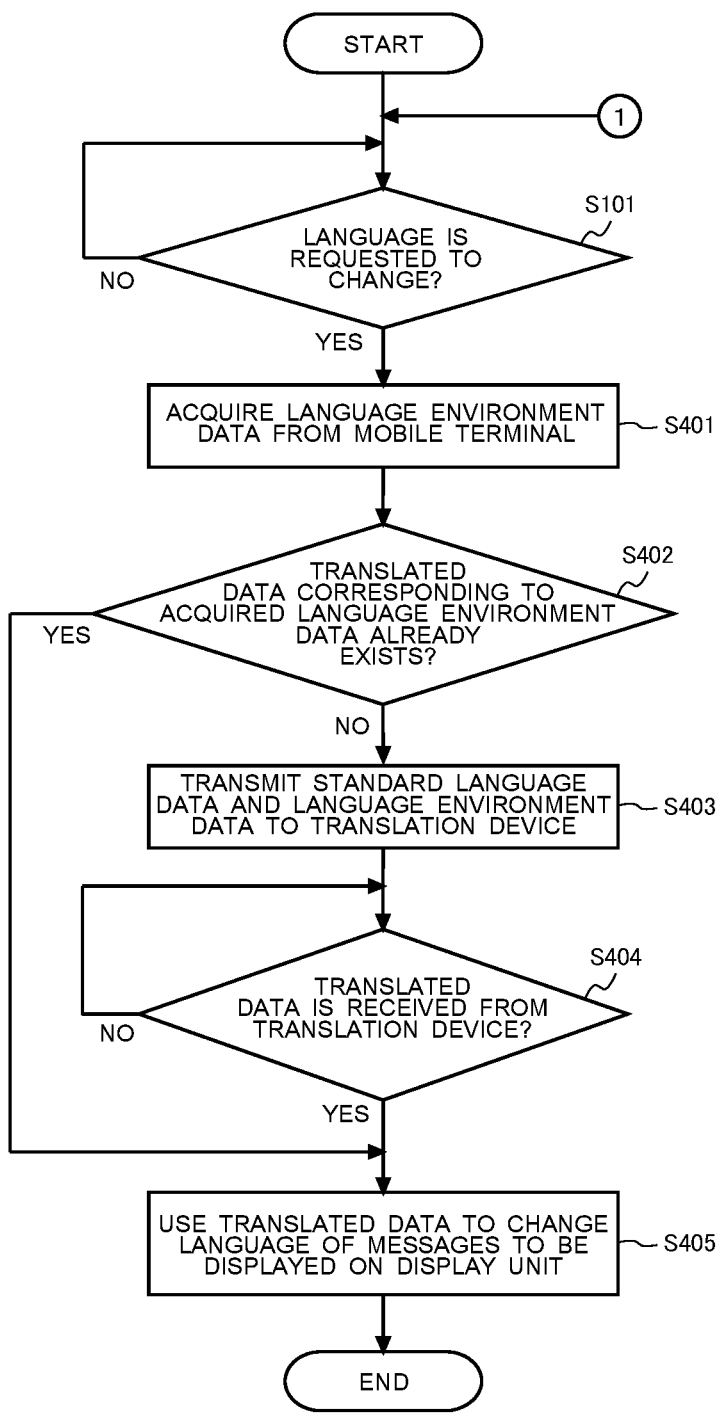
FIG. 19 is a flowchart illustrating a process of changing a language setting among operations by the central monitoring device in FIG. 17.

FIG. 19 is a flowchart illustrating a process of changing a language setting among operations by the central monitoring device in FIG. 17. With reference to FIG. 19, the operation content of the central monitoring device 120 centered on the multi-language display processing unit 122 will be described. Steps similar to those in FIG. 14A will be denoted with the same reference signs, and a description of steps will be omitted.

The multi-language display processing unit 122 stands by until a change request to change the language of the display unit 21*b* exists (NO in step S101), and when a change request to change the language of the display unit 21*b* exists (YES in step S101), the multi-language display processing unit 122 acquires language environment data from the mobile terminal 50 through the language environment data acquisition unit 126 (step S401).

Next, the multi-language display processing unit 122 determines whether or not translated data corresponding to the acquired language environment data already exists in the memory 25 (step S402). When translated data corresponding to the acquired language environment data does not exist (NO in step S402), the multi-language display processing unit 122 transmits the language environment data and the standard language data to the translation device 60 through the standard language data transmission unit 123 (step S403). Subsequently, the multi-language display processing unit 122 stands by until translated data is sent back from the translation device 60 (NO in step S404).

When translated data is received from the translation device 60 through the translated data reception unit 124 (YES in step S404), the multi-language display processing unit 122 uses the received translated data to change the language of messages to be displayed on the display unit 21*b*

(step S405). On the other hand, when translated data corresponding to the acquired language environment data exists (YES in step S402), the multi-language display processing unit 122 uses the translated data to change the language of messages to be displayed on the display unit 21b (step S405). Also, similarly to the multi-language display processing unit 22 described above, the multi-language display processing unit 122 executes the process of the series from step S105 to step S106 in FIG. 14B, or in other words, the process of reverting the language setting of the display unit 21b.

As described above, the central monitoring device 120 is able to acquire language environment data from the mobile terminal 50 and also determine whether or not translated data corresponding to the acquired language environment data already exists in the memory 25. Subsequently, when translated data corresponding to the most recent language environment data exists in the memory 25, the translated data can be used to change the language setting of the display unit 21b. In other words, in the central monitoring device 120, in the case in which translated data corresponding to the language environment data acquired from the mobile terminal 50 exists, as it is not necessary to communicate with the translation device 60, the language setting of the display unit 21b can be changed more rapidly. Of course, similarly to the central monitoring device 120, the remote controller 30 may also be configured to acquire language environment data from the mobile terminal 50 and exchange data with the translation device 60.

Embodiment described above is a preferable specific example of a management device, but the technical scope of the present invention is not limited to these modes. For example, Embodiment described above illustrates an example of a case in which each of the language setting of the central monitoring device 20 or 120 and the language setting of the remote controller 30 is changed separately, but the configuration is not limited to this example. For example, the management device may be configured in such a manner that when the language setting is changed in the central monitoring device 20 or 120, the content of the change is also used in the remote controller 30. Similarly, the management device may also be configured in such a manner that when the language setting is changed in the remote controller 30, the content of the change is also used in the central monitoring device 20. In other words, the central monitoring device 20 and the remote controller 30 may be configured to coordinate with each other in such a manner that when a change is made to the language setting in either one of the central monitoring device 20 and the remote controller 30, the language setting of the other is also changed accordingly.

In addition, for example, the management device may also be configured in such a manner that the language setting of the remote controller 30 is changeable from the central monitoring device 20 or 120. Similarly, the management device may be configured in such a manner that the language setting of the central monitoring device 20 or 120 is changeable from the remote controller 30.

Embodiment described above illustrates an example of a case in which the apparatus management system 40 includes the central monitoring device 20 and the remote controller 30, but the configuration is not limited to this example, and the apparatus management system 40 may also be configured not to include at least one of the central monitoring device 20 and the remote controller 30. In other words, by incorporating the functions of either one of the central monitoring device 20 and the remote controller 30 into the other, the apparatus management system 40 may be configured not to include the one of which functions are incorporated into the other. Also, the apparatus management system 140 may be configured not to include the remote controller 30.

Embodiment described above illustrates an example of a case in which the translation device 60 translates from the default language to the language set in the terminal, but the configuration is not limited to this example, and the translation device 60 may also have a function of translating from the language set in a certain mobile terminal 50 to the language set in another mobile terminal 50. In other words, for example, in the case in which the user touches the transition button $P_1$ on the floor list screen $A_1$ as in FIG. 11, the multi-language display processing unit 22 or 122 may cause the screen to transition to the change confirmation screen C as in FIG. 9. Subsequently, when the user touches the affirmative button M, the multi-language display processing unit 22 may be configured to transmit standard language data to a mobile terminal 50 that is communicable at that time. Also, when the user touches the affirmative button M, the multi-language display processing unit 122 may be configured to acquire language environment data from a mobile terminal 50 that is communicable at that time, and transmit the acquired language environment data and the standard language data to the translation device 60. Subsequently, the multi-language display processing unit 22 or 122 may be configured to replace messages not in the default language with messages in another language other than the default language by using translated data sent back from the translation device 60.

Embodiment described above illustrates an example of a case in which the central monitoring device 20 includes the input display unit 21, which is a touch panel, but the configuration is not limited to this example. For example, instead of the input display unit 21, the central monitoring device 20 may be configured to include a display unit and an input unit as separate bodies in such a manner that the display unit is a liquid crystal display (LCD) for example and the input unit includes multiple physical buttons for example for receiving operations input by the user. Similarly, instead of the input display unit 31, the remote controller 30 may be configured to include a display unit and an input unit as separate bodies in such a manner that the display unit is an LCD for example and the input unit includes multiple physical buttons for example for receiving operations input by the user.

FIGS. 1 and 17 illustrate an example of a case in which a single remote controller 30 is associated with the facility apparatus 10, but the configuration is not limited to this example, and a single remote controller 30 may also be associated with each combination of a single heat source device and a single load side device. Also, FIGS. 1 and 17 illustrate an example of a case in which the air-conditioning apparatus serving as the facility apparatus 10 includes four heat source devices and four load side devices, but the configuration is not limited to this example, and the air-conditioning apparatus serving as the facility apparatus 10 may also include one, two, three, or five or more of the heat source devices and one, two, three, or five or more of the load side devices.

REFERENCE SIGNS LIST 1A to 1D heat source device 2A to 2D load side device 3A to 3F internal communication wire 4A to 4D refrigerant pipe 5A, 5B wireless link 10 facility apparatus 20, 120 central monitoring device 21, 31 input display unit 21a, 31a input unit 21b, 31b display unit 22, 32, 122 multi-language display processing unit 23, 33, 123 standard language data transmission unit 24, 34, 124 translated data reception unit 25, 35, 53, 64 memory 30 remote controller 40, 140 apparatus management system 50 mobile terminal 51 standard language data reception unit 52 translated data transmission unit 54 data transmission unit 54a standard language data transmission unit 54b language environment data transmission unit 55 translated data reception unit 56 multi-language data processing unit 60 translation device 61 translation processing unit 62 language environment data reception unit 63 standard language data reception unit 65 translated data transmission unit 100, 100A multi-language display system 126 language environment data acquisition unit 200 public network 300 air-conditioned space $A_0$, $A_1$ floor list screen B language change instruction screen C, E change confirmation screen D, F language confirmation screen M affirmative button N negative button $P_0$, $P_1$ transition button Q language change button R confirmation button $T_0$, $T_1$ confirmation text U notification text W display field X to Z switching button

The invention claimed is:

1. A management device connected to an apparatus and configured to manage the apparatus, the management device comprising:
   a display configured to display information related to the apparatus;
   a memory configured to store standard language data that is information related to management of the apparatus and that includes messages created in a default language;
   an operator input configured to receive a change request to change a language of messages to be displayed on the display; and
   processing hardware including a processor, microcontroller or hardware circuit, the processing hardware being configured to
   acquire, via short-range wireless communication, language environment data representing a language environment of a mobile terminal from the mobile terminal which is close to the management device,
   when the operator input receives the change request, transmit the standard language data together with the acquired language environment data to an external translation server;
   acquire, from the translation server, translated data translated by the translation server with reference to the standard language data and the acquired language environment data into the language corresponding to the language environment of the mobile terminal; and
   change the language of messages to be displayed on the display from the default language to the language corresponding to the language environment of the mobile terminal by using the translated data.

2. The management device of claim 1, wherein the processing hardware is further configured to transmit the standard language data to the translation server through the mobile terminal.

3. The management device of claim 1, wherein
   the processing hardware is further configured to store the acquired translated data in the memory, and
   in a case in which the translated data corresponding to the language environment data acquired from the mobile terminal by the processing hardware is stored in the memory, change the language of messages to be displayed on the display by using the translated data.

4. The management device of claim 1, wherein
   the processing hardware is further configured to cause a change request button corresponding to the change request to be displayed on a screen of the display, and
   the operator input is further configured to receive an operation designating the change request button as the change request.

5. The management device of claim 4, wherein the processing hardware is further configured to, when the operator input receives the operation designating the change request button, cause the display to display a language confirmation screen including notification text created in the language corresponding to the language environment of the mobile terminal and a confirmation button prompting for confirmation of whether or not the changed language is suitable.

6. The management device of claim 4, wherein the processing hardware is further configured to
   cause the display to display a language change instruction screen including a language change button for receiving an instruction to change the language, and
   when the operator input receives an operation designating the language change button, cause the display to display a change confirmation screen including the change request button.

7. The management device of claim 6, wherein the processing hardware is further configured to
   cause a transition button for causing a screen of the display to transition to the language change instruction screen to be displayed, and
   when the operator input receives an operation designating the transition button, cause the screen of the display to transition to the language change instruction screen.

8. The management device of claim 6, wherein the processing hardware is further configured to cause confirmation text prompting for confirmation of whether or not to match a language setting of the display to a language setting of the mobile terminal to be displayed on the change confirmation screen.

9. The management device of claim 1, wherein the display and the operator input are attached to each other to form a touch panel.

10. An air-conditioning system, comprising:
    the management device of claim 1; and
    an air-conditioning apparatus connected to the management device and configured to air-condition an air-conditioned space.

11. The air-conditioning system of claim 10, wherein the management device is a central monitoring device configured to monitor the air-conditioning apparatus and to manage the air-conditioning apparatus overall.

12. The air-conditioning system of claim 10, wherein the management device is a remote controller provided with a function of remotely operating the air-conditioning apparatus.

* * * * *